(12) United States Patent
Takahashi

(10) Patent No.: US 8,302,644 B2
(45) Date of Patent: Nov. 6, 2012

(54) PNEUMATIC TIRE WITH TREAD HAVING SERIES OF DEPRESSIONS IN RIB

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 526 days.

(21) Appl. No.: 12/567,825

(22) Filed: Sep. 28, 2009

(65) Prior Publication Data

US 2010/0122760 A1    May 20, 2010

(30) Foreign Application Priority Data

Nov. 14, 2008    (JP) .................................. 2008-292409

(51) Int. Cl.
*B60C 11/117*    (2006.01)
(52) U.S. Cl. ......... 152/209.17; 152/209.22; 152/209.27; 152/DIG. 3
(58) Field of Classification Search ............. 152/209.15, 152/209.17, 209.22, 209.27, DIG. 3
See application file for complete search history.

(56) References Cited

U.S. PATENT DOCUMENTS

| | | | | |
|---|---|---|---|---|
| 2,298,033 A | * | 10/1942 | Bowers et al. | ........... 152/209.17 |
| 6,213,181 B1 | * | 4/2001 | Janajreh | ........................ 152/901 |

FOREIGN PATENT DOCUMENTS

| | | | |
|---|---|---|---|
| JP | 08-85308 | | 4/1996 |
| JP | 2000-16026 | | 1/2000 |
| KR | 2006-0053728 A | * | 5/2006 |

OTHER PUBLICATIONS

Machine translation for Korea 2006-0053728 (no date).*

* cited by examiner

*Primary Examiner* — Steven D Maki
(74) *Attorney, Agent, or Firm* — Fish & Richardson P.C.

(57) ABSTRACT

A pneumatic tire has a rib sectionalized by main grooves extending along a tire circumferential direction in a center portion of a tread surface. Depressions are arranged in series in a center portion in a width direction of the rib so as to leave a space in the tire circumferential direction. The depressions extend in the tire circumferential direction and become wider from both end portions in a longitudinal direction toward a center portion.

13 Claims, 4 Drawing Sheets

PNEUMATIC TIRE WITH TREAD HAVING SERIES OF DEPRESSIONS IN RIB

BACKGROUND OF THE INVENTION

1. Field of the Invention

The present invention relates to a pneumatic tire in which a rib sectionalized by main grooves extending along a tire circumferential direction is provided in a tread surface.

2. Description of the Related Art

In a tire for a passenger car in recent years, attaching importance to a steering stability at a time of going straight at a high speed, a pattern having a rib sectionalized by main grooves extending along a tire circumferential direction in a center portion of a tread surface is a mainstream. In the tire mentioned above, particularly in the case that the tire is installed to a rear side, there is a tendency that an irregular wear referred to as a so-called center wear that the rib provided in the center portion of the tread surface wears in an early stage is generated. This tendency is as remarkable as an aspect ratio of the tire is lower.

Japanese Unexamined Patent Publication No. 2000-16026 describes a tire structured such that an irregular wear can be suppressed by providing a small circular hole in the vicinity of an end in a width direction of a land portion. However, this technique suppresses a ground pressure increase in the vicinity of the end in the width direction in a lateral force input side, for suppressing an irregular wear (particularly, taper wear in a rib) under a condition that the input in the tire width direction is dominating, in a heavy load tire. On the other hand, the center wear mentioned above is an irregular wear under a condition that a compression of the rib by an input in a tire diametrical direction is dominating, and cannot be sufficiently suppressed even by providing the small hole in the end in the width direction of the rib. Japanese Unexamined Patent Publication No. 2000-16026 positions that an intended effect cannot be obtained in the case that the small hole is provided in a center side of the land portion.

Japanese Unexamined Patent Publication No. 8-85308 describes a pneumatic tire in which a lot of circular or oval dimples are arranged in a rib, and a peripheral length in a foot print at a time of applying a load is made substantially identical between a shoulder rib and an inside rib. However, this technique only adjusts the circumferential length of each of the ribs by collapsing the dimples from a tire circumferential direction, and is not enough to suppress the center wear as mentioned above.

SUMMARY OF THE INVENTION

The present invention is made in view of the above circumstances, and an object thereof is to provide a pneumatic tire which can inhibit a center wear from being generated without deteriorating a steering stability.

The object can be achieved by the following present invention. That is, the present invention provides a pneumatic tire in which a rib sectionalized by main grooves extending along a tire circumferential direction is provided in a center portion of a tread surface, wherein depressions which extend in the tire circumferential direction and become wider from both end portions in a longitudinal direction toward a center portion are arranged in series in a center portion in a width direction of the rib so as to leave a space in the tire circumferential direction.

In the pneumatic tire according to the present invention, since the depression having the shape as mentioned above is provided in the center portion in the width direction of the rib, it is possible to effectively absorb a buckling deformation of the rib caused by a compression at a time of applying the load. Accordingly, it is possible to prevent a portion which is locally strongly pressed to the ground surface from being generated in the rib, and it is possible to inhibit an early wear of the rib so as to inhibit the center wear from being generated. Further, since the depressions are arranged in series by leaving a space in the tire circumferential direction, it is possible to suppress the center wear while securing a rigidity of the rib and maintaining a steering stability.

In the present invention, it is preferable that a relation $S \geqq W/4$ is satisfied, in the case of setting a width of the rib to W, and setting a distance from an end in a width direction of the rib to a center of the depression to S. Accordingly, a distance between the end in the width direction of the rib and the depression can be secured, and the depression is accurately arranged in the center portion in the width direction of the rib. As a result, it is possible to better absorb the buckling deformation of the rib caused by the compression at a time of applying the load by the depression so as to suitably inhibit the center wear from being generated.

In the present invention, it is preferable that a depression row constructed by the depressions is provided in a rib passing through a tire equator. Since the center wear is remarkably generated in the rib passing through the tire equator, the structure of the present invention is particularly useful.

In the present invention, it is preferable that the depression has a pair of arcuate wall surfaces opposing to each other, and the arcuate wall surface is constructed by a top portion which is curved in a convex shape toward an end in the width direction of the rib, and a skirt portion which is curved in a convex shape toward the depression so as to be smoothly connected to the top portion. It is possible to more effectively absorb the buckling deformation of the rib caused by the compression at a time of applying the load, by setting the depression having the shape mentioned above. Further, since the arcuate wall surface which is curved as mentioned above is provided, it is possible to prevent a crack from being generated due to a repeated deformation of the depression.

In the present invention, it is preferable that the depressions which are adjacent to each other are communicated with each other by a narrow groove which extends along the tire circumferential direction and is shallower than the depression. Accordingly, since the air within the depression can move through the narrow groove, it is possible to inhibit a high frequency noise from being generated by the depression row.

In the present invention, it is preferable that a relation $2L \leqq P \leqq 5L$ is satisfied in the case of setting a length in the tire circumferential direction of the depression to L, and setting a pitch of the depression to P. Accordingly, the depressions are provided at a suitable interval, and it is possible to secure the suppressing effect of the center wear by the depression, as well as it is possible to secure the rigidity of the rib so as to maintain the steering stability.

DETAILED DESCRIPTION OF THE PREFERRED EMBODIMENTS

Figure 1:
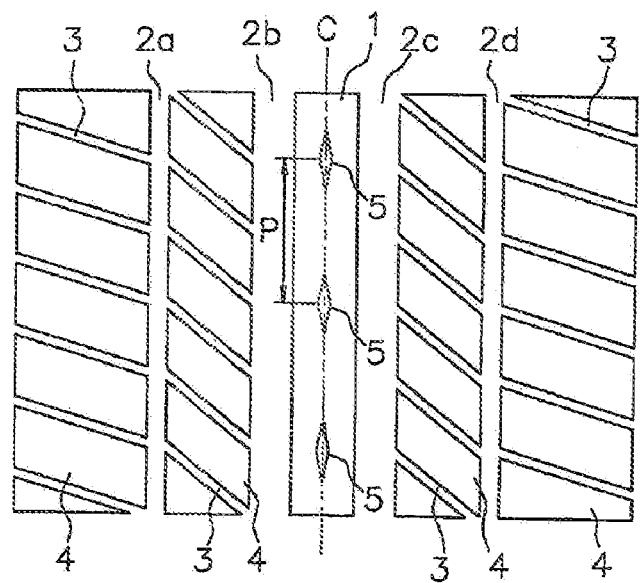
FIG. 1 is a plan view showing an example of a tread surface of the pneumatic tire of the invention.
Figure 2:
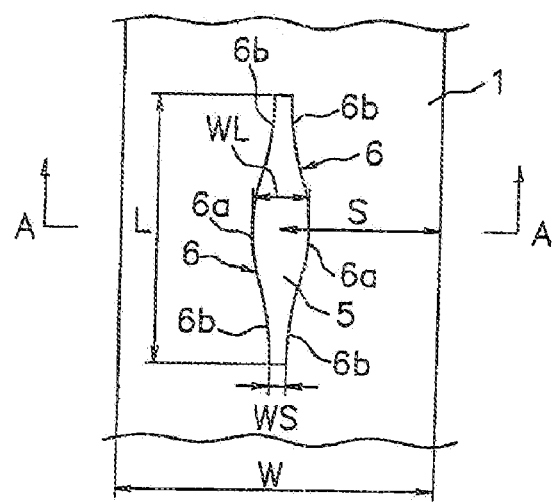
FIG. 2 is an enlarged view of a main part of the tread surface shown in FIG. 1.
Figure 3:
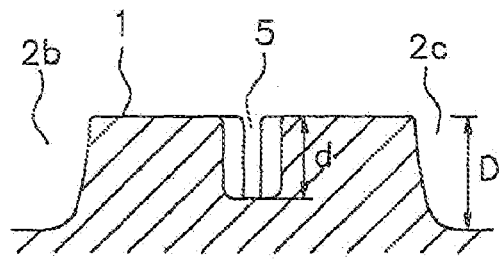
FIG. 3 is a sectional view taken along the line A-A in FIG. 2.

An embodiment of the present invention will be explained with reference to the drawings. FIG. 1 is a plan view showing an example of a tread surface of the pneumatic tire of the invention. FIG. 2 is an enlarged view of a main part of the tread surface. FIG. 3 is a sectional view taken along the line A-A in FIG. 2.

The tread surface is provided with four main grooves 2a to 2d extending along a tire circumferential direction, and a transverse groove 3 extending obliquely along a tire width direction. A center portion of the tread surface is provided with a rib 1 which is sectionalized by the main grooves 2b and 2c sandwiching a tire equator C therebetween, and blocks 4 sectionalized by the transverse groove 3 are arranged in both sides thereof in a tire circumferential direction. Depressions 5 are arranged in series so as to leave a space in the tire circumferential direction, in a center portion in the width direction of the rib 1. The depression 5 extends in the tire circumferential direction, and is formed in such a manner as to be wider from both end portions in a longitudinal direction toward the center portion.

Figure 4:
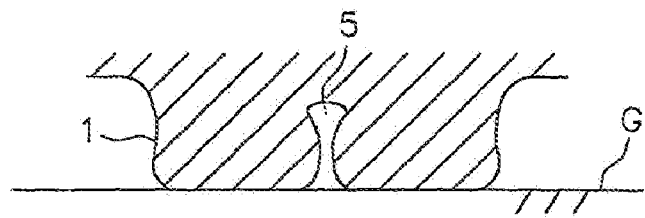
FIG. 4 is a cross sectional view conceptually showing a deformation of a rib in the pneumatic tire according to the present invention.
Figure 5:
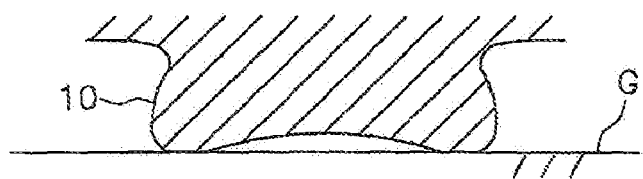
FIG. 5 is a cross sectional view conceptually showing a deformation of a rib in a conventional pneumatic tire.

Since the depression 5 having the shape mentioned above is provided in the center portion in the width direction of the rib 1, it is possible to effectively absorb the buckling deformation of the rib 1 caused by the compression at a time of applying the load, and it is possible to suppress an early wear of the rib 1 so as to inhibit a center wear from being generated, as shown in FIG. 4. On the contrary, in the normal rib which does not have the depression 5 having the shape mentioned above, a buckling deformation is generated by the compression at a time of applying the load as shown in FIG. 5, there is generated a portion which is locally strongly pressed to a ground surface G, and the center wear is generated by prompting an early wear of the rib 10.

A width W of the rib 1, and a distance S from the end in the width direction of the rib 1 to the center of the depression 5 preferably satisfy a relation $S \geq W/4$, and more preferably satisfy a relation $S \geq W/3$. Accordingly, it is possible to suitably inhibit the center wear from being generated by accurately arranging the depression 5 in the center portion in the width direction of the rib 1, and well absorbing the buckling deformation of the rib 1.

In the present embodiment, the depression 5 has a pair of arcuate wall surfaces 6 opposing to each other. Each of the arcuate wall surfaces 6 is constructed by a top portion 6a which is curved in a convex shape toward the end in the width direction of the rib 1, and a skirt portion 6b which is smoothly connected to the top portion 6a while being curved in a convex shape toward the depression 5, and the skirt portion 6b is coupled to both sides in the longitudinal direction of the top portion 6a. In this case, since the depression 5 is easy to be smoothly closed from the tire width direction, it is possible to effectively absorb the buckling deformation of the rib 1 caused by the compression at a time of applying the load.

It is preferable that a length L in the tire circumferential direction of the depression 5, and a pitch P of the depression 5 satisfy a relation $2L \leq P \leq 5L$. If the relation $2L > P$ is satisfied, there is a tendency that a rigidity of the rib 1 is lowered and a steering stability is lowered, and if the relation $P > 5L$ is satisfied, there is a tendency that the effect of suppressing the center wear by the depression 5 becomes small.

A maximum width WL of the depression 5 is preferably equal to or more than 2 mm in the light of securing the effect of absorbing the buckling deformation of the rib 1, and is more preferably equal to or more than 3 mm. Further, it is preferable that the maximum width WL is between 5 and 30% the width W of the rib 1. A minimum width WS of the depression 5 is, for example, between 0.5 and 2 mm. It is preferable that the length L in the tire circumferential direction of the depression 5 is equal to or more than twice the maximum width WL of the depression 5, whereby it is possible to suitably secure a volume of the depression 5 and it is possible to well absorb the buckling deformation of the rib 1 so as to improve an irregular wear resistance.

A depth d of the depression 5 and a depth D of the main groove preferably satisfy a relation $D/3 \leq d$, and more preferably satisfy a relation $D/2 \leq d$. Since the relation $D/3 \leq d$ is satisfied, it is possible to suitably secure the volume of the depression 5, it is possible to well absorb the buckling deformation of the rib 1, and it is possible to improve the irregular wear resistance.

Figure 6:
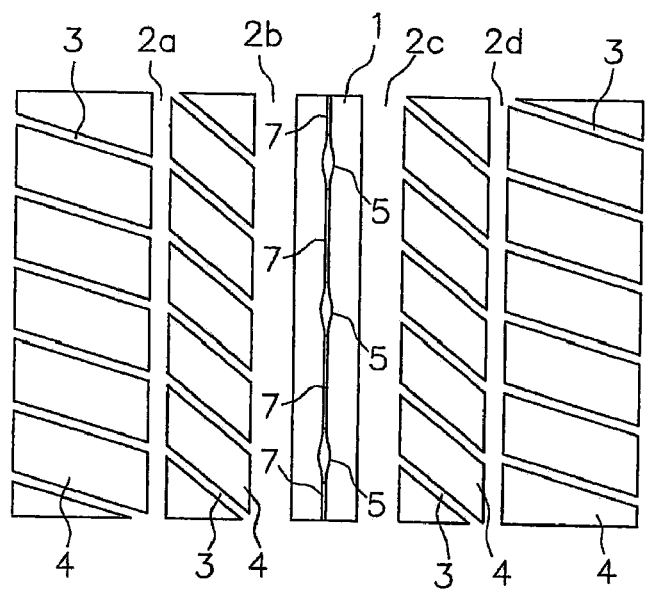
FIG. 6 is a plan view showing a tread surface according to another embodiment of the present invention.
Figure 7:
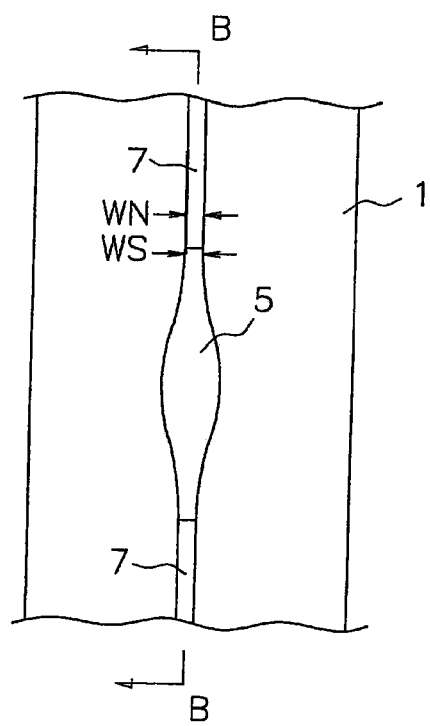
FIG. 7 is an enlarged view of a main part of the tread surface shown in FIG. 6.
Figure 8:
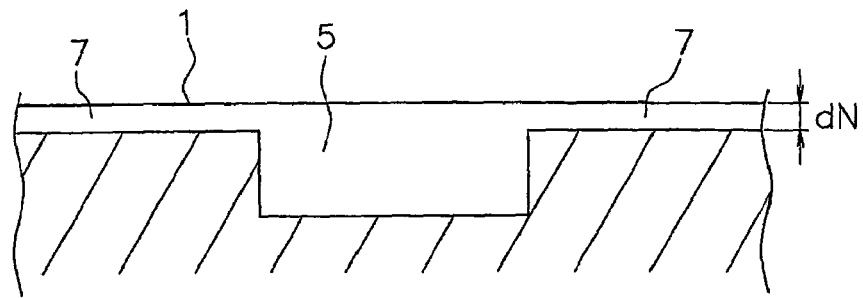
FIG. 8 is a sectional view taken along the line B-B in FIG. 7.

In a tread surface shown in FIG. 6, the depressions 5 which are adjacent to each other are communicated by a narrow groove 7 extending along the tire circumferential direction. The narrow groove 7 is formed shallower than the depression 5 as shown in FIGS. 7 and 8, and a groove width WN of the narrow groove 7 is made in line with the minimum width WS of the depression 5 in the present embodiment. In the structure mentioned above, since the air within the depression 5 can move through the narrow groove 7, it is possible to inhibit a high frequency noise caused by the depression row constructed by the depressions 5 from being generated.

It is preferable that the narrow groove 7 is equal to or more than 0.5 mm in its groove width WN and its depth dN, in the light of securing the effect of suppressing the high frequency noise as mentioned above. Further, it is preferable that the groove width WN and the depth dN are equal to or less than 2 mm in the light of securing the rigidity of the rib 1 and maintaining the steering stability.

In the present embodiment, the depression row constructed by the depressions 5 is provided in the rib 1 passing through the tire equator C. In the rib 1 mentioned above, the center wear is remarkably generated, however, according to the present invention, it is possible to achieve the operation and effect as mentioned above so as to suppress the irregular wear.

Figure 9:
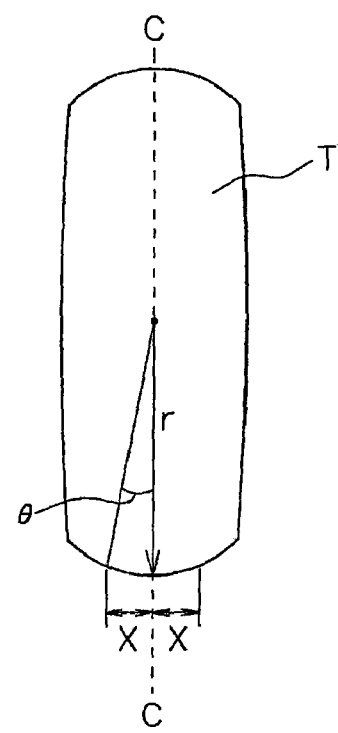
FIG. 9 is a tire front elevational view for explaining an offset region of a rib.

In the present invention, the rib provided with the depression row may be offset from the tire equator C. The rib in this case can be provided, as shown in FIG. 9, in such a manner that the center line passes through a region which is a value X away from the tire equator C in the tire width direction. The value X is calculated by an equation a radius r of a tire T×tan θ, in which θ is about 3°. In the case of setting a camber angle or employing a complicated asymmetrical pattern, the center wear may be generated in the rib which is offset from the tire equator C, and the irregular wear can be suppressed by applying the present invention to the rib.

The pneumatic tire in accordance with the present invention is the same as a normal pneumatic tire except that the depressions as mentioned above are provided in the rib of the tread surface, and it is possible to employ the conventionally known material, shape, structure, manufacturing method and the like to the present invention. In the tire for the passenger car in which the aspect ratio is low, in particular the aspect ratio is equal to or less than 55%, since the center wear is remarkably generated, the present invention is particularly useful.

[Other Embodiment]

(1) The tread pattern of the pneumatic tire according to the present invention is not limited to that shown in the embodiment mentioned above, but various patterns can be employed as far as the rib is provided in the center portion of the tread surface. The main groove sectionalizing the rib is not limited to extend straight along the tire circumferential direction, but may extend in a zigzag shape.

(2) In the embodiment mentioned above, there is exemplified the depression 5 having the arcuate wall surface 6 constructed by the top portion 6a and the skirt portion 6b as mentioned above, however, the shape of the depression in the present invention is not limited thereto. For example, the depression may have a skirt portion extending obliquely like a taper, or may have a wall surface having a bent shape. Taking into consideration an easiness for absorbing the buckling deformation of the rib caused by the compression at a time of applying the load, and a crack resistance against a repeated deformation of the depression, the shape shown by the embodiment mentioned above is preferable.

(3) In the embodiment mentioned above, there is shown the example in which the depression row is provided in the center rib in the land portion sectionalized by four main grooves, however, the present invention is not limited thereto. In the present invention, "center portion of tread surface" is set to a center region at a time of dividing the tread surface into three sections in the tire width direction based on the ground width, and the depression row may be formed in the rib which laps over at least partly the region. For example, the present invention includes the structure in which the land portion sectionalized by the main grooves 2a and 2b is formed as the rib in the tread surface in FIG. 1, and the depression row is provided in the rib.

In the structure mentioned above, the ground width is a distance, in a tire axial direction between the ground ends, and the ground end indicates an outermost position in the tire axial direction which grounds on a flat road surface at a time of assembling to a normal rim, putting the tire vertically to the road surface in state in which a normal internal pressure is filled, and applying a normal load. Further, the normal rim is a standard rim which is in principle defined in JISD4202 or the like, and the normal load and the normal internal pressure are a maximum load (a design normal load in the case of the tire for the passenger car) defined in JISD4202 (data of automobile tire) or the like and a pneumatic pressure corresponding thereto.

EXAMPLE

An example tire which concretely shows the structure and effect of the present invention will be explained. Items to be evaluated and test methods are as follows, however, the test was carried out by installing a test tire in which a tire size was set to 225/45R17, a used rim was set to 17×7.5 JJ, a pneumatic pressure was set to 220 kPa, and a depth of a main groove was set to 8 mm, to a 2500 cc passenger car, in each of the evaluations.

(1) Steering Stability

A steering stability was evaluated by executing a feeling test by two drivers on a dry road and a wet road. A result of a comparative example 1 is set to 100 as an index number, and indicates that the larger the numerical value is, the better the steering stability is.

(2) Irregular Wear Resistance

An irregular wear resistance was evaluated by dividing an amount of wear in a center portion of a tire after traveling for 12000 km on a general road by an amount of wear in a shoulder portion, and calculating an irregular wear ratio (amount of wear of the center portion/amount of wear of the shoulder portion). The closer to 1.0 the numerical value is, the more the tendency of the uniform wear is shown, and the greater the numerical value is, the stronger the tendency of the center wear is shown.

(3) Noise Characteristic

A noise characteristic was evaluated by executing a feeling test with respect to a high frequency noise by two drivers on a dry road. A result of a comparative example 1 is set to 100 as an index number, and indicates that the larger the numerical value is, the better the noise characteristic is.

COMPARATIVE EXAMPLES 1 AND 2

A comparative example 1 was set to a tire which has the tread pattern as shown in FIG. 1 and is not provided with a depression in a rib. Further, a comparative example 2 was set to a tire which is the same as the comparative example 1 except a structure in which a narrow groove having a groove width 1 mm and a depth 6.5 mm is provided in a center portion in a width direction of the rib along a tire circumferential direction.

EXAMPLES 1 to 7

Examples 1 to 7 were set to tires which have the tread pattern as shown in FIG. 1, and in which the depressions as shown in FIGS. 1 and 2 were arranged in series in the center portion in the width direction of the rib so as to leave a space in the tire circumferential direction. The example 3 is the same as the example 2 except a structure in which a narrow groove having a groove width 1 mm and a depth 2 mm is provided in the center portion in the width direction of the rib so as to communicate the depressions with each other. Dimensions of the depression are shown in Table 1, and results of evaluation are shown in Table 2.

TABLE 1

| | dimension of depression (mm) | | | | |
|---|---|---|---|---|---|
| | width WL | width WS | length L | depth d | pitch P |
| comparative example 1 | — | — | — | — | — |
| comparative example 2 | — | — | — | — | — |
| example 1 | 3.0 | 1.0 | 13.0 | 6.5 | 26.0 |
| example 2 | 3.0 | 1.0 | 13.0 | 6.5 | 65.0 |
| example 3 | 3.0 | 1.0 | 13.0 | 6.5 | 65.0 |
| example 4 | 3.0 | 1.0 | 4.5 | 6.5 | 65.0 |
| example 5 | 3.0 | 1.0 | 13.0 | 2.0 | 65.0 |
| example 6 | 3.0 | 1.0 | 13.0 | 6.5 | 20.0 |
| example 7 | 3.0 | 1.0 | 13.0 | 6.5 | 80.0 |

TABLE 2

|  | steering stability | | irregular wear resistance | noise characteristic |
|---|---|---|---|---|
|  | dry road | wet road | | |
| comparative example 1 | 100.0 | 100.0 | 2.0 | 100.0 |
| comparative example 2 | 94.0 | 96.0 | 1.6 | 100.0 |
| example 1 | 98.0 | 99.0 | 1.0 | 98.0 |
| example 2 | 99.0 | 100.0 | 1.0 | 98.0 |
| example 3 | 98.0 | 99.0 | 1.0 | 100.0 |
| example 4 | 100.0 | 100.0 | 1.4 | 98.0 |
| example 5 | 100.0 | 100.0 | 1.2 | 98.0 |
| example 6 | 96.0 | 98.0 | 1.2 | 97.0 |
| example 7 | 100.0 | 100.0 | 1.4 | 99.0 |

In the comparative example 1, the center wear is remarkably generated in comparison with the others. Further, in the comparative example 2, the steering stability is greatly lowered by the narrow groove provided in the rib. On the contrary, in the examples 1 to 7, it is possible to inhibit the center wear from being generated while maintaining the steering stability in its way. Particularly, in the examples 1 to 3, it is possible to maintain both the steering stability and the irregular wear resistance at a high level, by setting the dimension of the depression suitable. In addition, in the example 3, an excellent noise characteristic can be generated by suppressing the high frequency noise.

What is claimed is:

1. A pneumatic tire in which a rib sectionalized by main grooves extending along a tire circumferential direction is provided in a center portion of a tread surface, wherein depressions which extend in the tire circumferential direction and become wider from both end portions in a longitudinal direction toward a center portion are arranged in series in a center portion in a width direction of the rib so as to leave a space in the tire circumferential direction, and further wherein the depressions have a pair of arcuate wall surfaces opposing to each other, and the arcuate wall surfaces are constructed by a top portion which is curved in a convex shape toward an end in the width direction of the rib, and a skirt portion which is curved in a convex shape toward the depression so as to be smoothly connected to the top portion.

2. The pneumatic tire according to claim 1, wherein a relation $S \geqq W/4$ is satisfied, in the case of setting a width of the rib to W, and setting a distance from an end in a width direction of the rib to a center of the depression to S.

3. The pneumatic tire according to claim 1, wherein a depression row constructed by the depressions is provided in a rib passing through a tire equator.

4. The pneumatic tire according to claim 1, wherein a length in the tire circumferential direction of the depression is equal to or more than twice the maximum width of the depression.

5. The pneumatic tire according to claim 1, wherein a maximum width of the depression is equal to or more than 2 mm and between 5 and 30% the width of the rib.

6. The pneumatic tire according to claim 1, wherein a relation $D/3 \leqq d$ is satisfied in the case of setting a depth of the depression to d and setting a depth of the main groove to D.

7. The pneumatic tire according to claim 1, wherein the depression has a minimum width in an end in a circumferential direction.

8. The pneumatic tire according to claim 1, wherein the depressions which are adjacent to each other are communicated with each other by a narrow groove which extends along the tire circumferential direction and is shallower than the depression.

9. The pneumatic tire according to claim 8, wherein the depression has a minimum width in an end in a circumferential direction, and the narrow groove is connected to the end in the circumferential direction of the depression.

10. The pneumatic tire according to claim 9, wherein a groove width of the narrow groove is made in line with the minimum width of the depression.

11. The pneumatic tire according to claim 1, wherein a relation $2L \leqq P \leqq 5L$ is satisfied in the case of setting a length in the tire circumferential direction of the depression to L, and setting a pitch of the depression to P.

12. The pneumatic tire according to claim 1, wherein the rib provided with the depression row constructed by the depressions is offset from a tire equator.

13. The pneumatic tire according to claim 1, wherein the pneumatic tire is a tire for a passenger car in which an aspect ratio is equal to or less than 55%.

* * * * *